United States Patent
Nakamura et al.

(10) Patent No.: US 7,599,012 B2
(45) Date of Patent: Oct. 6, 2009

(54) LUMINOUS DISPLAY DEVICE

(75) Inventors: Go Nakamura, Shizuoka (JP); Tetsuya Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 248 days.

(21) Appl. No.: 11/633,533

(22) Filed: Dec. 5, 2006

(65) Prior Publication Data

US 2007/0132897 A1    Jun. 14, 2007

(30) Foreign Application Priority Data

Dec. 8, 2005   (JP)   ............................. 2005-354542

(51) Int. Cl.
*G02F 1/1335* (2006.01)
(52) U.S. Cl. ............................. 349/11; 349/57; 349/65; 349/113; 359/630; 362/561; 362/560
(58) Field of Classification Search ............ 349/7, 349/65, 95, 113, 11, 57, 56, 61, 62; 362/612, 362/559, 560; 359/630, 631
See application file for complete search history.

(56) References Cited

U.S. PATENT DOCUMENTS

| | | | | |
|---|---|---|---|---|
| 5,657,163 A | | 8/1997 | Wu et al. ..................... 359/630 |
| 5,684,548 A | * | 11/1997 | Ariki et al. ..................... 349/57 |
| 5,754,344 A | * | 5/1998 | Fujiyama ..................... 359/631 |
| 6,124,920 A | * | 9/2000 | Moseley et al. ............. 349/201 |
| 6,412,953 B1 | * | 7/2002 | Tiao et al. ..................... 353/98 |
| 6,643,067 B2 | * | 11/2003 | Miyamae et al. ............ 359/619 |
| 7,184,212 B2 | * | 2/2007 | Takahashi et al. ........... 359/462 |
| 2004/0062040 A1 | | 4/2004 | Blume et al. ................. 362/231 |

FOREIGN PATENT DOCUMENTS

| | | |
|---|---|---|
| DE | 102 45 580 | 5/2004 |
| DE | 10 2004 007 802 | 9/2005 |
| JP | 2000-56254 | 2/2000 |

* cited by examiner

*Primary Examiner*—Thoi V Duong
(74) *Attorney, Agent, or Firm*—Kratz, Quintos & Hanson, LLP

(57) ABSTRACT

In the rear of a liquid crystal display arranged with an inclination to a line of sight reflected by a concave mirror, a backlight and a focusing lens member are arranged in such a manner that the backlight and the focusing lens member are positioned on a plane perpendicular to the line of sight reflected by the concave mirror, and the focusing lens member focuses beams of illumination light from the backlight in such a manner that the beams of illumination light stays within a range of the liquid crystal display.

3 Claims, 4 Drawing Sheets

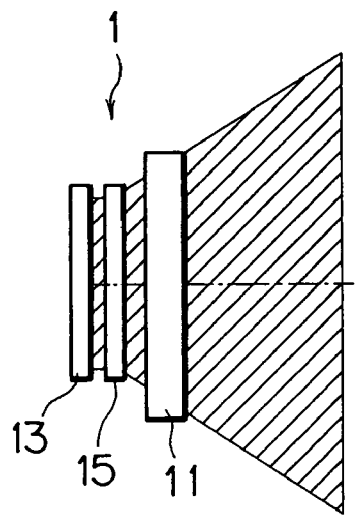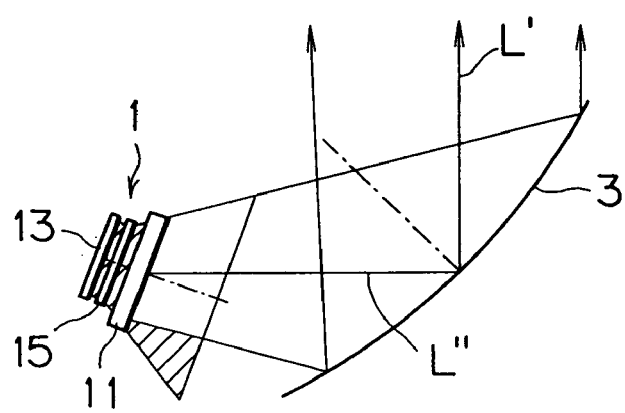
FIG. 8　　　　FIG. 9
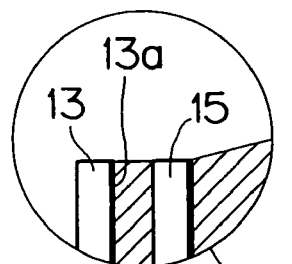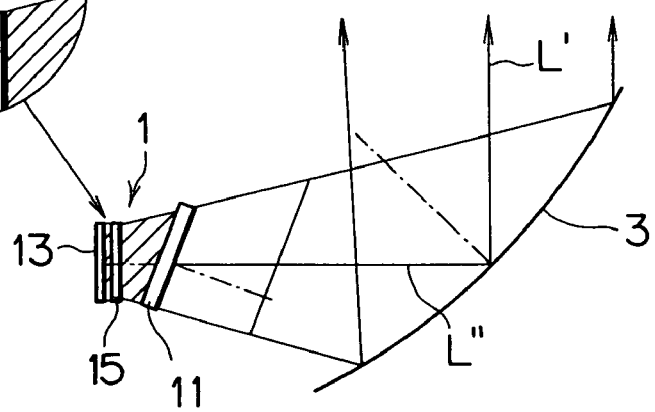
FIG. 10

LUMINOUS DISPLAY DEVICE

BACKGROUND OF THE INVENTION (1) Field of the Invention

The present invention relates to a luminous display device which reflects light of a display image emitted from a liquid crystal display by means of transmission of illumination light from a backlight so as to provide the reflected light to be seen.

(2) Description of the Related Art

So far, for example in a vehicle, in order to make a driver see various information by superposing on a view in front of a windshield, a head-up display has been used, in which light of a display image from a liquid crystal display in a dash-board is reflected to the side of the driver by the windshield or a combiner arranged on this side of the windshield, so that a virtual image of the display image can be seen on the windshield or the combiner.

Further, in a vehicle, in some cases, in order to lighten the burden imposed on driver's eyes due to a large change in a focal distance during eye motion upon traveling of the vehicle, information displayed as a real image by a combination meter is subjected to be seen with a display device of a virtual image display type.

In such a display device of a virtual image display type, light of a display image from a liquid crystal display is reflected once or a plurality of times by a reflecting mirror in a dash-board, then the reflected light is subjected to be seen by a driver. By elongating an optical path with the reflection of the light by the reflecting mirror, the focal distance is brought close to a focal distance when a front view through a windshield is seen.

In the display devices described above, since the windshield, combiner and reflecting mirror for reflecting the light of the display image are arranged with an inclination to a line of sight from the driver to the liquid crystal display, therefore in order to prevent the virtual image to be seen by the driver from inclining and being seen distorted due to a gap of the optical path from the driver to the liquid crystal display generated between the upper side and the lower side of the display image, the liquid crystal display is arranged with an inclination to the line of sight from the driver to the liquid crystal display.

Moreover, another reason why the liquid crystal display is arranged with an inclination to the line of sight from the driver to the liquid crystal display is to prevent that external light such as sun light entered into a vehicle through the windshield reaches the liquid crystal display and its reflected light reaches eyes of the driver together with the light of the display image (for example, Japanese Patent Application Laid-Open No. 2000-56254.

Generally, light of an image emitted from a liquid crystal display is divergent light having an optical axis having a direction perpendicular to a display surface of the liquid crystal display because a backlight is arranged in parallel with the liquid crystal display.

Therefore, if the liquid crystal display is arranged with an inclination to the line of sight from the driver to the liquid crystal display, an irradiation range of the light of an image from the liquid crystal display is deviated with respect to a layout of the reflecting members such as the windshield, combiner and reflecting mirror, which are located on the line of sight.

Such a deviation makes a part of the light of an image run off to the outside of the reflecting members, causing an insufficient amount of light of the display image. Therefore, it is necessary to arrange the liquid crystal display and the backlight close to the direction perpendicular to the line of sight as much as possible so that all of the light of an image is irradiated to the inside of the reflecting members.

However, if the liquid crystal display and the backlight are arranged in such a manner as described above, a gap of the optical path from the backlight to the driver between the upper side and the lower side of the display image is generated, so that a difference takes place in a degree of attenuation in the light of an image, causing generation of nonuniformity in brightness for the virtual image of the display image, which is seen by the driver.

SUMMARY OF THE INVENTION

It is therefore an objective of the present invention to solve the above problem and to provide a luminous display device, by which the illumination light from the backlight can be efficiently used and the virtual image of the display image displayed on the liquid crystal display can be subjected to be seen to the driver on the reflecting members with a sufficient and uniform brightness even if the liquid crystal display is arranged with an inclination to the line of sight reflected by the reflecting members and therefore the liquid crystal display is not arranged in parallel with the reflecting members.

In order to attain the above objective, the present invention is to provide a luminous display device including:

a reflecting member arranged with an inclination to a line of sight;

a liquid crystal display arranged with an inclination to the line of sight reflected by the reflecting member;

a backlight; and a focusing lens member arranged between the backlight and the liquid crystal display, wherein illumination light from the backlight is irradiated from the rear of the liquid crystal display and light of a display image displayed on the liquid crystal display is emitted toward the reflecting member, so that a virtual image being seen on the reflecting member is image-formed on a plane perpendicular to the line of sight, wherein the backlight is arranged in such a manner that a luminous surface of the backlight is perpendicular to the line of sight reflected by the reflecting member, wherein the focusing lens member focuses beams of the illumination light in such a manner that the beams of the illumination light emitted from the luminous surface of the backlight stays inside the reflecting member and that the beams of the illumination light, which pass through the liquid crystal display to become the light of a display image, stays inside the reflecting member.

With the construction described above, the illumination light from the backlight can be used efficiently. A gap of an optical path from the backlight to the eye point between the upper side and the lower side of the display image can be prevented from occurring and therefore, a virtual image of the displayed image being seen from the eye point can be prevented from having nonuniformity in brightness.

Preferably, the focusing lens member is constructed in an arrayed form in which a plurality of focusing lenses are arranged on a plane.

With the construction described above, in comparison with a case in which the focusing lens member is constructed with a single focusing lens, a curvature of a convex surface of the lens can be small. Therefore, the making of the lens can be easy and a thickness of the focusing lens member in a direction of the line of sight can be small.

Preferably, the backlight is constructed in such a manner that a plurality of point light sources are arranged on a plane and each focusing lens is arranged so that an optical axis of the focusing lens is aligned with that of the corresponding point light source.

With the construction described above, by making each focusing lens focus the beams of the illumination light from the corresponding point light source, the light beams of the whole illumination light can be efficiently focused into a desired range.

BRIEF DESCRIPTION OF THE DRAWINGS

FIG. 8 shows an outline of a construction of a luminous display unit shown in FIG. 1;

FIG. 9 shows a relation between an arrangement of a liquid crystal display and a backlight shown in FIG. 8 and an irradiation range of light of a display image;

FIG. 10 shows a relation between an arrangement of a liquid crystal display and a backlight shown in FIG. 8 and an irradiation range of light of a display image when the arrangement is changed from that of FIG. 10;

DESCRIPTION OF THE PREFERRED EMBODIMENTS

In the following, the preferred embodiments of a luminous display device according to the present invention will be explained with reference to the attached drawings.

Figure 1:
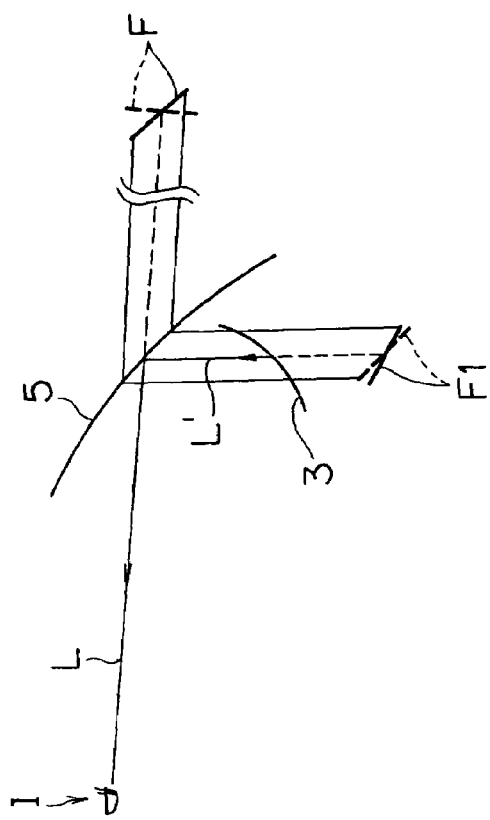
FIG. 1 shows an outline of a construction of a luminous display device according to a preferred embodiment of the present invention.

FIG. 1 shows an outline of a construction of a luminous display device according to a preferred embodiment of the present invention. The luminous display device according to the preferred embodiment is applied to a head-up display, in which light of a display image from a luminous display unit 1 received in a dash-board (not shown in the figure) of a vehicle is reflected and enlarged by a concave mirror 3 (i.e. reflecting member), reached to an eye point I of a driver via reflection by a windshield 5, and seen by the driver with superposing a virtual image F of the display image on a view in front of the windshield.

In detail, the driver sees a virtual image of a first virtual image F1 located in the rear of the concave mirror 3 as a final virtual image F of the display image located in front of the windshield 5.

First, an layout required to the luminous display unit 1 is explained in the following. The virtual image F of the display image being seen in front of the windshield 5 by the driver should be image-formed on a plane perpendicular to a line of sight L of the driver from the eye point I so as not to be inclined and deformed in the up-and-down direction.

Figure 2:
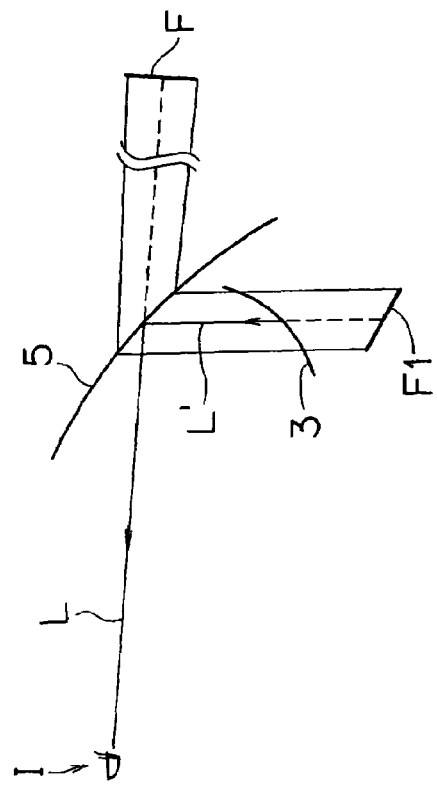
FIG. 2 shows a relation between an image formation position of a virtual image in front of a windshield and an image formation position of a first virtual image in the rear of a concave mirror, the virtual images being seen from an eye point shown in FIG. 1.

If the first virtual image F1 in the rear of the concave mirror 3 is image-formed on a plane perpendicular to a line of sight L' reflected by the windshield 5 as shown in FIG. 2, the virtual image F being inclined and deformed is seen from the eye point I in such a manner that an upper side of the virtual image F is situated far while a lower side thereof is situated near because the windshield 5 is arranged with an inclination to the line of sight L.

Figure 3:
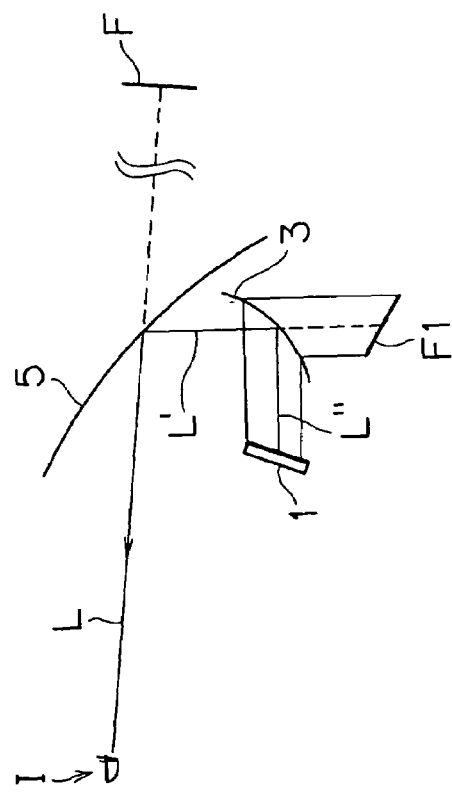
FIG. 3 shows a relation between an image formation position of a virtual image in front of a windshield and an image formation position of a first virtual image in the rear of a concave mirror, the virtual images being seen from an eye point shown in FIG. 1.

On the other hand, if the first virtual image F1 in the rear of the concave mirror 3 is image-formed on a plane approximately parallel to the windshield 5 as shown in FIG. 3, the virtual image F being inclined and deformed is seen from the eye point I in such a manner that an upper side of the virtual image F is situated near while a lower side thereof is situated far, that is, the virtual image F is approximately parallel to the windshield 5.

Figure 4:
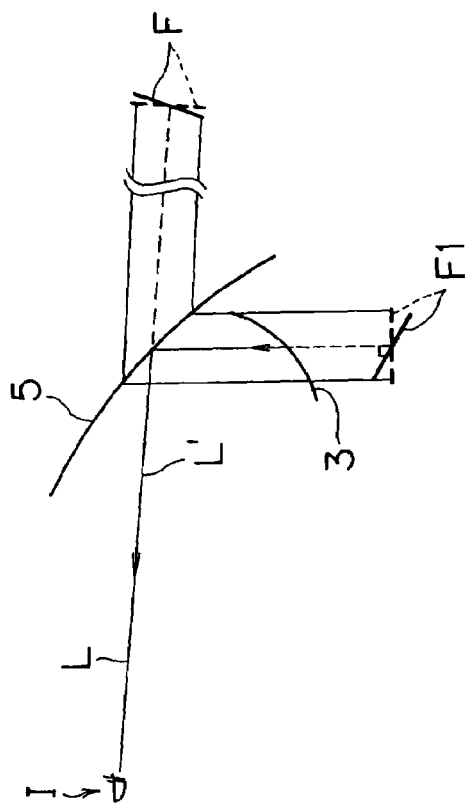
FIG. 4 shows a relation between an image formation position of a virtual image in front of a windshield and an image formation position of a first virtual image in the rear of a concave mirror, the virtual images being seen from an eye point shown in FIG. 1.

Accordingly, in order that the virtual image F of the display image is image-formed on a plane perpendicular to the line of sight L, as shown in FIG. 4, the first virtual image F1 in the rear of the concave mirror 3 must be image-formed on a plane having some inclination to the line of sight L' reflected by the windshield 5, though the inclination being not so large as that of the windshield 5.

Figure 5:
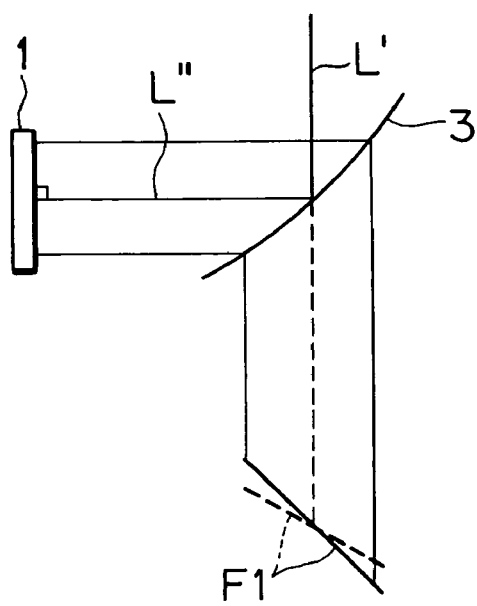
FIG. 5 shows a relation between an arrangement of a luminous display unit shown in FIG. 1 and an image formation position of a first virtual image in the rear of a concave mirror.

In the following, it will be discussed in what direction the luminous display unit 1 must be arranged in front of the concave mirror 3 in order that the first virtual image F1 is image-formed on the plane shown in FIG. 4. If the luminous display unit 1 is arranged on a plane perpendicular to a line of sight L" reflected by the concave mirror 3, as shown in FIG. 5, the first virtual image F1 seen in the rear of the concave mirror 3 when it is viewed from the line of sight L' reflected by the windshield 5 is image-formed on a plane having a shifted inclination with respect to a target plane in such a manner that an upper side of the first virtual image F1 is far from the concave mirror 3 while a lower side thereof is near to the concave mirror 3.

Figure 6:
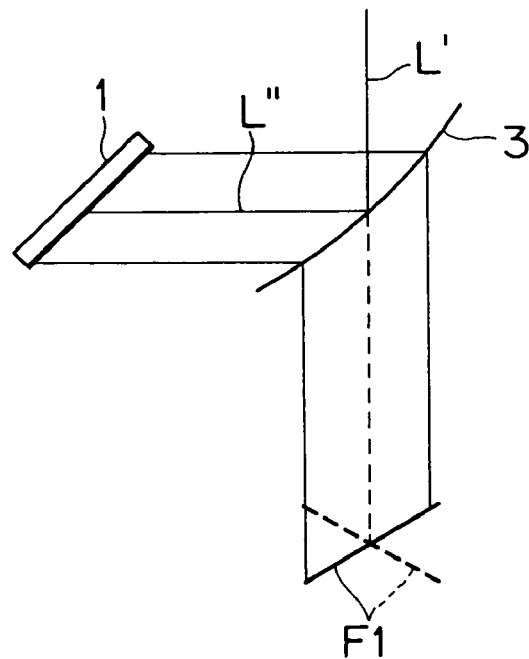
FIG. 6 shows a relation between an arrangement of a luminous display unit shown in FIG. 1 and an image formation position of a first virtual image in the rear of a concave mirror.

On the other hand, if the luminous display unit 1 is arranged on a plane approximately parallel to the concave mirror 3, as shown in FIG. 6, when the first virtual image F1 is viewed from the line of sight L' reflected by the windshield 5, the first virtual image F1 being seen in the rear of the concave mirror 3 is image-formed on a plane having a shifted inclination with respect to a target plane in such a manner that an upper side of the first virtual image 1 is near to the concave mirror 3 while a lower side thereof is far from the concave mirror 3.

Figure 7:
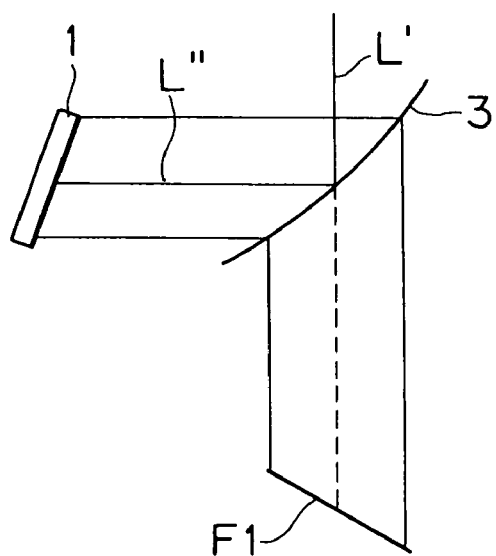
FIG. 7 shows a relation between an arrangement of a luminous display unit shown in FIG. 1 and an image formation position of a first virtual image in the rear of a concave mirror.

Accordingly, in order that the first virtual image F1 is image-formed on the plane shown in FIG. 4, as shown in FIG. 7, the luminous display unit 1 must be arranged on a plane having some inclination to the line of sight L" reflected by the concave mirror 3, though said plane is not very parallel to the concave mirror 3.

As shown in FIG. 8, the luminous display unit 1 includes: a liquid crystal display 11 for displaying a display image; a backlight 13 of a face luminescence-type arranged in the rear of the liquid crystal display 11 for emitting illumination light; and a focusing lens member 15 arranged between the liquid crystal display 11 and the backlight 13 for focusing beams of the illumination light emitted from the backlight 13 within a range of the liquid crystal display 11.

As described above, the luminous display unit 1 must be arranged on a plane having some inclination to the line of sight L" reflected by the concave mirror 3. Therefore, if an optical axis of the illumination light emitted from the backlight 13 is arranged with some inclination to the line of sight L" reflected by the concave mirror 3, as shown in FIG. 9, a part of light of the display image, which passes through the liquid crystal display 11 and advances toward the concave mirror 3, strays off outside the concave mirror 3 with an amount corresponding to that the optical axis is arranged with some inclination to the line of sight L" reflected by the concave mirror 3, causing insufficient amount of light for the display image.

In a luminous display device according to a preferred embodiment of the present invention, as shown in FIG. 10, the backlight 13 and the focusing lens member 15 are arranged in such a manner that the optical axis of the illumination light is aligned with the line of sight L" reflected by the concave mirror 3, that is, a luminous face 13a of the backlight 13 is perpendicular to the line of sight L", thereby the light of the display image, which passes through the liquid crystal display 11 and advances toward the concave mirror 3, stays within a range of the concave mirror 3.

Figure 11:
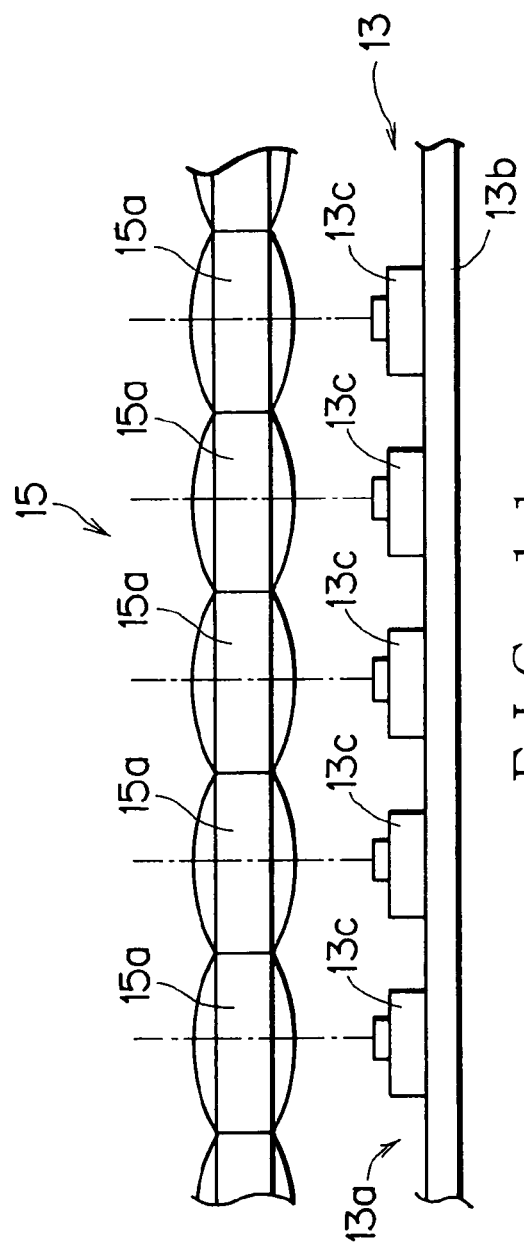
FIG. 11 shows an outline of a construction of a backlight and a focusing lens member shown in FIG. 8.
Figure 12:
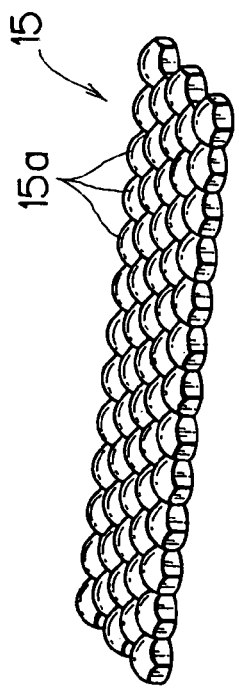
FIG. 12 is a perspective view of a focusing lens member shown in FIG. 11.

In detail, as shown in FIG. 11, the backlight 13 includes a plurality of white-color light emitting diodes 13c (i.e. a plurality of point light sources) arranged on a substrate 13b, and as shown in FIG. 12, the focusing lens member 15 includes a plurality of focusing lenses 15a arranged on a plane in an array-shape.

As shown in FIG. 11, each focusing lens 15a of the focusing lens member 15 is arranged with respect to a corresponding white-color light emitting diode 13c of the backlight 13 in such a manner that an optical axis of illumination light emitted from each white-color light emitting diode 13c is aligned with an optical axis of a corresponding focusing lens 15a, so that these optical axes are parallel to the line of sight L" reflected by the concave mirror 3.

Figure 13:
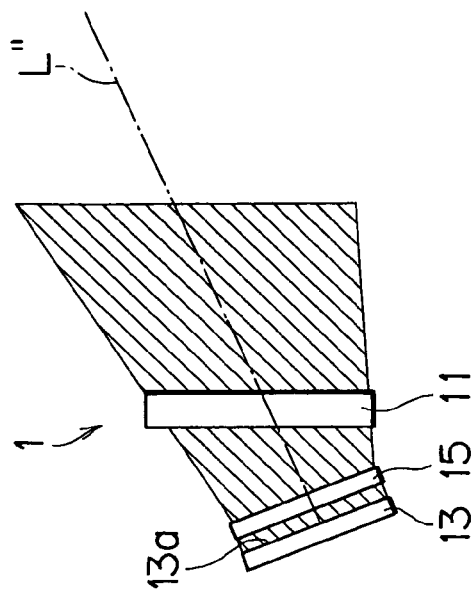
FIG. 13 shows an outline of a construction of a luminous display unit shown in FIG. 1 when an arrangement shown in FIG. 10 is adopted.

Thereby, as shown in FIG. 13, the beams of the illumination light emitted from each white-color light emitting diode 13c, which are focused by the corresponding focusing lens 15a, stay within a range of the liquid crystal display 11 that is arranged with some inclination to the line of sight L" reflected by the concave mirror 3 as to the whole backlight 13, so that the light of display image passed through the liquid crystal display 11 stays within the range of the concave mirror 3 as shown in FIG. 10.

When the focusing lens 15a is parted away from the corresponding white-color light emitting diode 13c, the illumination light after being focused becomes close to parallel rays, while a ratio for focusing the beams of the illumination light, which is diffuse light, by using the focusing lens 15a is decreased. On the other hand, when the focusing lens 15a closely approaches the corresponding white-color light emitting diode 13c, the illumination light after being focused becomes close to diffuse light, while the ratio for focusing the beams of the illumination light by using the focusing lens 15a is increased.

If the ratio for focusing the beams of the illumination light by using the focusing lens 15a is increased, the illumination light emitted from the backlight 13 can be efficiently used for the light of the display image by the liquid crystal display 11 so as to increase the brightness. On the other hand, if the illumination light after being focused by the focusing lens 15a becomes close to parallel rays the illumination light emitted from the backlight 13 is irradiated onto a wide range of the concave mirror 3 and the windshield 3 after the illumination light passes through the liquid crystal display 11. Therefore, a distance between the backlight 13 and the focusing lens member 15 may be optimized taking the above characteristic into consideration.

That is, in the preferred embodiment described above, the beams of the illumination light emitted from the luminous face 13a of the backlight 13, which is arranged perpendicular to the line of sight L" reflected by the concave mirror 3, stays within the range of the liquid crystal display 11 by means of the liquid crystal display 11 arranged with an inclination to the line of sight L" reflected by the concave mirror 3 and the focusing lens member 15 arranged between the liquid crystal display 11 and the backlight 13. Moreover, the beams of the illumination light that becomes the light of the display image after passing through the liquid crystal display 11 are focused inside the concave mirror 3. Thereby, the illumination light from the backlight 13 can be used efficiently. A gap of an optical path from the backlight 13 to the eye point I between the upper side and the lower side of the display image can be prevented from occurring and therefore, the virtual image of the displayed image being seen from the eye point I can be prevented from having nonuniformity in brightness.

The focusing lens member 15 may be composed of a single focusing lens. However, in comparison with such a case in which the focusing lens member 15 is constructed with a single focusing lens, if the focusing lens member 15 includes a plurality of focusing lenses 15a arranged on a plane in an array-shape, a curvature of a convex surface of the lens can be small. Therefore, the making of the lens can be easy and a thickness of the focusing lens member 15 in a direction of the line of sight L" after the reflection by the concave mirror 3 can be small.

The point light source for use in the backlight 13 may be not a white-color light emitting diode 13c. Further, the backlight 13 may include a light source except a point light source.

However, as shown in FIG. 11, if a plurality of the white-color light emitting diodes 13c as the point light sources are arranged on a substrate 13b and each focusing lens 15a of the focusing lens member 15 is arranged with respect to a corresponding white-color light emitting diode 13c of the backlight 13 in such a manner that an optical axis of illumination light emitted from each white-color light emitting diode 13c is aligned with an optical axis of a corresponding focusing lens 15a as described in the above preferred embodiment, the beams of the whole illumination light can be advantageously efficiently focused within a desired range.

In the preferred embodiment described above, the present invention is applied, as an example, to a head-up display for a vehicle, in which light of a display image from the liquid crystal display 11 is reflected by the concave mirror 3 and the windshield 5, and reached to the eye point I. However, the present invention also can be widely applied to a luminous display device, including a luminous display device for a non-vehicle use, for example, to a display device of a virtual image display-type in which a display image by means of a liquid crystal display and a backlight is reflected by a reflecting mirror so as to make the image be seen from an eye point, that is, provided that the display device is a luminous display device in which a luminous display image from a liquid crystal display is reflected by a reflecting member so as to make the image be seen.

The aforementioned preferred embodiments are described to aid in understanding the present invention and variations may be made by one skilled in the art without departing from the spirit and scope of the present invention.

What is claimed is:

1. A luminous display device comprising:
   a reflecting member arranged with an inclination from being perpendicular to a line of sight, said line of sight being from an eye point of a viewer to a virtual image;
   a liquid crystal display arranged with an inclination to the line of sight as reflected by the reflecting member;
   a backlight; and
   a focusing lens member arranged between the backlight and the liquid crystal display,
   wherein illumination light from the backlight is irradiated from the rear of the liquid crystal display and light of a display image displayed on the liquid crystal display is emitted toward the reflecting member, so that the virtual image being seen on the reflecting member is image-formed on a plane perpendicular to the line of sight,
   wherein the backlight is arranged in such a manner that a luminous surface of the backlight is perpendicular to the line of sight as reflected by the reflecting member,
   wherein the focusing lens member focuses beams of the illumination light in such a manner that the beams of the illumination light emitted from the luminous surface of the backlight stay inside the reflecting member and that the beams of the illumination light, which pass through the liquid crystal display to become the light of a display image, stay inside the reflecting member.

2. The device according to claim 1, wherein the focusing lens member is constructed in an arrayed form in which a plurality of focusing lenses are arranged on a plane.

3. The device according to claim 2, wherein the backlight is constructed in such a manner that a plurality of point light sources are arranged on a plane and each focusing lens is arranged so that an optical axis of the focusing lens is aligned with that of one of the point light sources in a one to one corresponding relationship.

* * * * *